(12) United States Patent
Jackson et al.

(10) Patent No.: US 7,328,145 B2
(45) Date of Patent: Feb. 5, 2008

(54) METHOD AND SYSTEM FOR EMULATION OF AN INTERNETWORK OPERATING SYSTEM DEVICE

(75) Inventors: Rod Jackson, Capitola, CA (US); Tarun Raisoni, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 11/099,812

(22) Filed: Apr. 5, 2005

(65) Prior Publication Data
US 2006/0224376 A1  Oct. 5, 2006

(51) Int. Cl.
*G06F 9/455* (2006.01)
(52) U.S. Cl. ............ 703/24; 370/53; 370/295; 703/23; 703/26; 703/27; 709/223
(58) Field of Classification Search ............ 703/24, 703/23, 26, 27; 370/53, 295; 709/223
See application file for complete search history.

(56) References Cited

U.S. PATENT DOCUMENTS

| | | | |
|---|---|---|---|
| 5,278,823 A | | 1/1994 | Handel |
| 6,295,518 B1* | 9/2001 | McLain et al. ............... 703/23 |
| 6,892,174 B1* | 5/2005 | Gaspar ........................ 703/23 |
| 2002/0156612 A1* | 10/2002 | Schulter et al. ............... 703/23 |
| 2003/0069970 A1* | 4/2003 | Kim et al. .................. 709/225 |

OTHER PUBLICATIONS

Ayman Kayssi, Ali El-Haj-Mahmout; EmuNET: a real-time network emulator; Feb. 5, 2004; ISBN: 1-58113-812-1.*

* cited by examiner

*Primary Examiner*—Kamini Shah
*Assistant Examiner*—Jonathan Teets
(74) *Attorney, Agent, or Firm*—Trellis Intellectual Property Law Group, PC

(57) ABSTRACT

A method and apparatus for emulation of IOS in a feasible and efficient manner are provided. The method includes defining a data structure to hold a data set; opening a socket connection to the device; sending instructions to return the command data for an index value; storing the returned command data in the data structure; incrementing the index value, repeating the sending, the storing and the incrementing till the index value exceeds the depth of command data to be captured; and writing the command data captured in the data structure to a file. The depth of command data to be captured or stored can be defined by specifying an index value in the data structure.

22 Claims, 3 Drawing Sheets

METHOD AND SYSTEM FOR EMULATION OF AN INTERNETWORK OPERATING SYSTEM DEVICE

BACKGROUND OF THE INVENTION

1. Field of Invention

Embodiments of the invention relate in general to network management software. More specifically, the embodiments of the invention relate to methods and systems for emulation of an Internetwork Operating System (IOS) device.

2. Description of the Background Art

There has been a tremendous growth in the area of internetworking over the past few decades. IOS devices are network management devices that are driven by Internerwork operating system (IOS). Exemplary IOS include CISCO Internetwork Operating System (IOS) and CATalyst Operating System (CATOS). IOS further includes a Command Line Interface (CLI) to manage network management devices.

New IOS devices are introduced in the market to meet the growing demands of network management. However, the network management software is rarely ready when a new IOS device is released in the market.

Many players are attempting to solve the problem of network management of IOS devices using extensible Markup Language (XML). In conventional techniques, IOS commands are emulated and stored in an ASCII format. The stored commands are then used for modeling the IOS commands for a new device. However, in conventional techniques, the entire command is written as a single line. The command is loaded in memory and parser as a linear list, with each node in the list being the entire command. This format makes the storing and loading of commands a difficult and time-consuming process, since there are usually millions of commands. Moreover, the amount of data that is required to be loaded is very large in the case of the linear list.

Furthermore, conventional techniques require users who want to learn new devices to manually enter all the commands and then capture the response to the entire command string. Therefore, the user is required to type all the commands that are required to be simulated. This makes conventional systems unfeasible and difficult to scale, since there are millions of commands.

Further, conventional methods do not allow pieces and fragments of commands to be learned and modeled, as required, in certain cases.

DETAILED DESCRIPTION OF EMBODIMENTS OF THE INVENTION

The various embodiments of the invention provide a method, a system, and a computer program product for emulation of an Internetwork Operating System (IOS) device. The embodiments of the invention provide a method that enables emulation of IOS in a feasible and efficient manner. The method comprises learning Command Line Interface (CLI) from an IOS device, post-processing the information so learned; and storing and loading the commands in a data structure that writes the commands to a file that is stored in the memory of a hard disk. The depth of the command data to be captured or stored can be defined by specifying an index value in the data structure. The various embodiments of the invention learn the commands without any input from the user.

In one embodiment of the invention, a method is provided for emulation of an IOS device. The method comprises (i) defining a data structure to hold a data set wherein the data structure is characterized by one or more index values, the index value being less than or equal to the total depth of the command data to be captured; (ii) opening a socket connection to the device; (iii) sending instructions to return the command data for an index value; (iv) storing the returned command data in the data structure; (v) incrementing the index value, repeating the sending, the storing and the incrementing till the index value exceeds the depth of command data to be captured; and (vi) writing the command data captured in the data structure to a file. In various embodiments of the invention, character "?" is sent as an instruction to return command data from the IOS device.

In another embodiment of the invention, a system is provided for emulation of an IOS device. The system comprises (i) an operating system; (ii) a data structure to hold a data set wherein the data structure is characterized by one or more index values, the index value being less than equal to the total depth of the command data to be captured; (iii) a socket connection to the IOS device; (iv) a sending module for sending instructions to return the command data for an index value (v) a storing module for storing the returned command data in the data structure; (vi) an incrementing module for incrementing the index value, wherein the increment is performed till the index value exceeds the depth of the command data; (vii) a writing module for writing all the data captured in the data structure of a file; and (viii) memory space on a hard disk, for writing the file. In various embodiments of the invention, character "?" is sent as an instruction to return command data from the IOS device.

Figure 1:
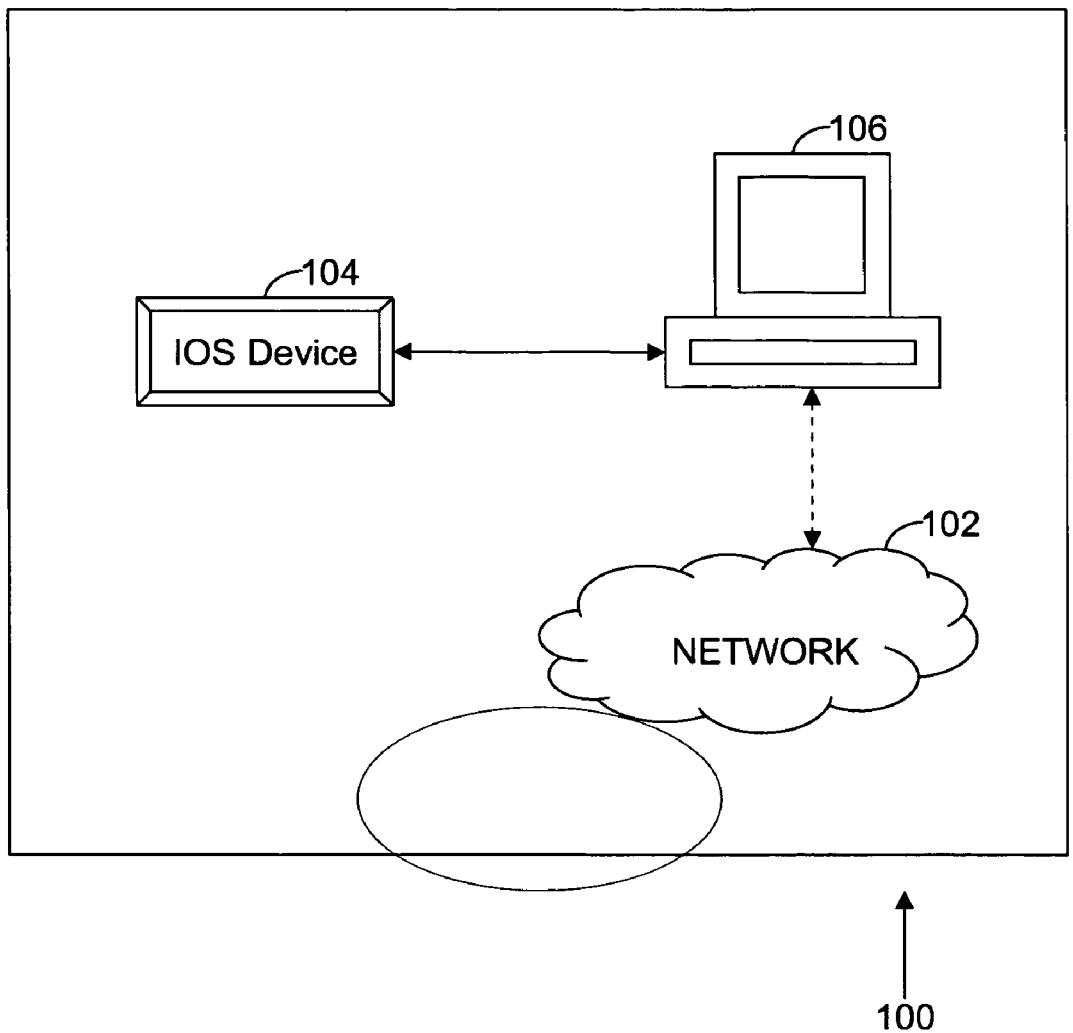
FIG. 1 illustrates a network environment, in accordance with an exemplary embodiment of the present invention.

FIG. 1 illustrates a network environment 100, in accordance with an exemplary embodiment of the present invention. Network environment 100 includes an IOS device 104 and a computing system 106, connected to a network 102. Network 102 can be a collection of individual networks, interconnected to each other and functioning as a single large network. Examples of networks include, but are not limited to, a Local Area Network (LAN), a Wide Area Network (WAN), a Metropolitan Area Network (MAN), and a Virtual Private Network (VPN). IOS device 104 is an intermediate networking device that connects individual networks. IOS device 104 is driven by an IOS. Examples of IOS device 104 include routers and switches. IOS device 104 is connected to computing system 106 via a network connection. In one embodiment, a physical Ethernet cable makes the network connection between IOS device 104 and computer system 106. In various embodiments, computing system 106 includes an operating system (OS), a processor, and a memory space in a hard disk. Examples of processor include Pentium®, Centrino®, Power PC®, Digital Signal Processor (DSP), and so on. Examples of OS include Linux, Windows, Solaris, AIX, and Mac. Computing system 106 also includes one or more user input devices (such as a mouse, keyboard, microphone, pen, and so on), and one or more output devices (such as a suitable display, speakers, actuators, and so on), in accordance with a particular application.

Figure 2:
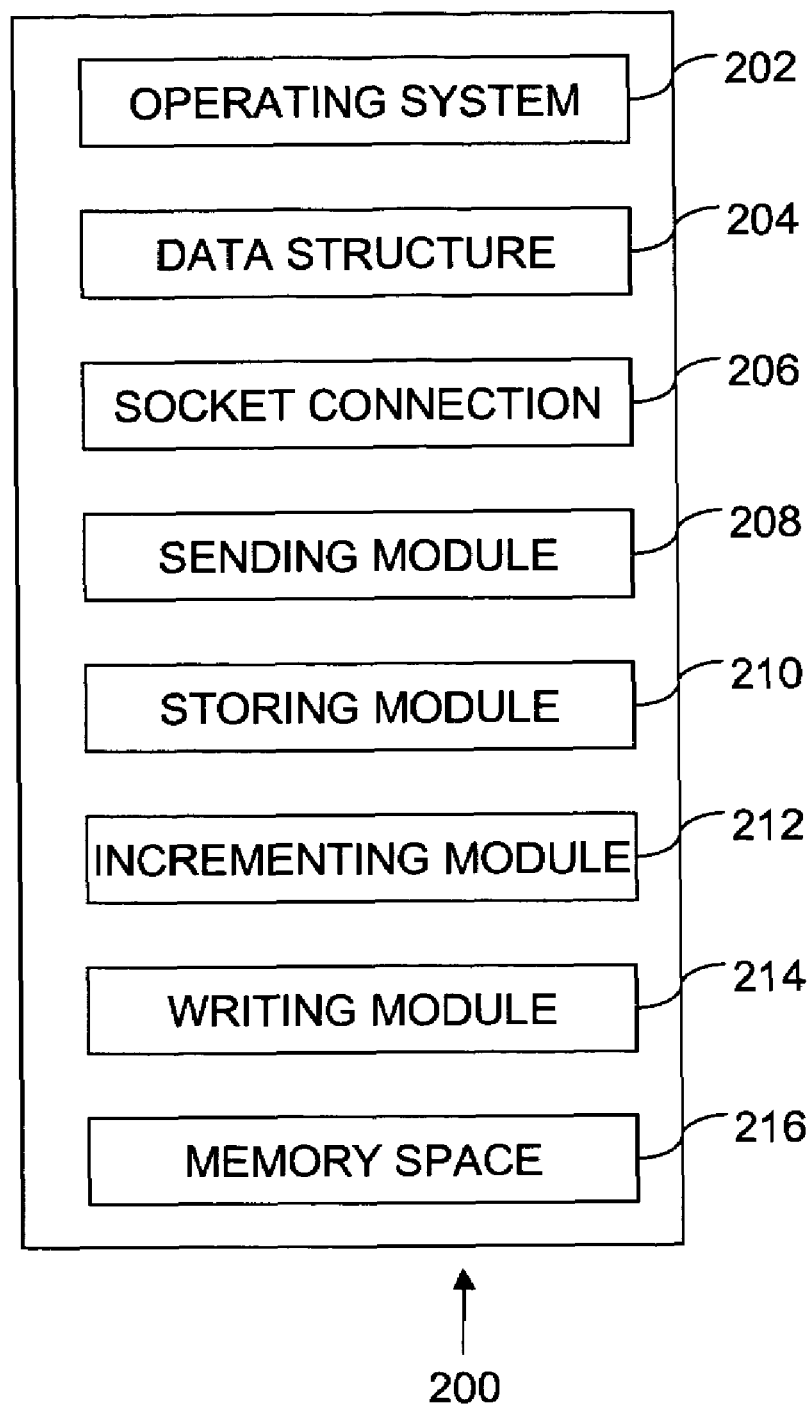
FIG. 2 illustrates a system for emulation of an IOS device, in accordance with an exemplary embodiment of the present invention.

FIG. 2 illustrates a system 200 for emulation of an IOS device, in accordance with an exemplary embodiment of the present invention. System 200 includes an operating system 202, a data structure 204, a socket connection 206, a sending module 208, a storing module 210, an incrementing module 212, a writing module 214, and a memory space 216.

In various embodiments of the invention, operating system 202 can be selected from a group comprising Linux, Windows, Solaris, AIX and Mac. Data structure 204 holds the data set. Data structure 204 is characterized by user parameters for the total depth of command data to be captured from IOS device 104. These parameters are defined in terms of index values. Each index value corresponds to a certain depth of command data. Selecting a particular index value returns corresponding depth of command data. In various embodiments of the invention, data structure 204 is defined in a tree format. Data structure 204 writes the data to an ASCII-based text file. This file is stored in memory space 216 in the hard disk.

Socket connection 206 provides access to IOS device 104. Examples of socket connection 206 include a telnet and a Secure Shell (SSH) connection. In various embodiments of the invention, IOS device 104 can provide socket connection 206 on a configured or a default port. Sending module 208 sends instructions to return the command data for an index value specified in data structure 204. In various embodiments of the invention, character "?" is sent as an instruction to return command data from the IOS device. The depth of the command data returned depends on the index value specified. Storing module 210 loads and stores the returned command data in a tree-based data structure 204. Incrementing module 212 increments the index value till the index value exceeds the depth of the command data captured. In an embodiment, the index value is incremented till a predefined level, thereby allowing learning of only a piece/fragment, as compared to the entire IOS device. Writing module 214 writes the data stored in data structure 204 in the ASCII-based file. In various embodiments of the invention, this file can be programmatically modified and can be reused to solve other problems in the network management domain.

In various embodiments of the invention, the system elements of system 200 can be implemented in the form of software, hardware, firmware, or their combination thereof.

Figure 3:
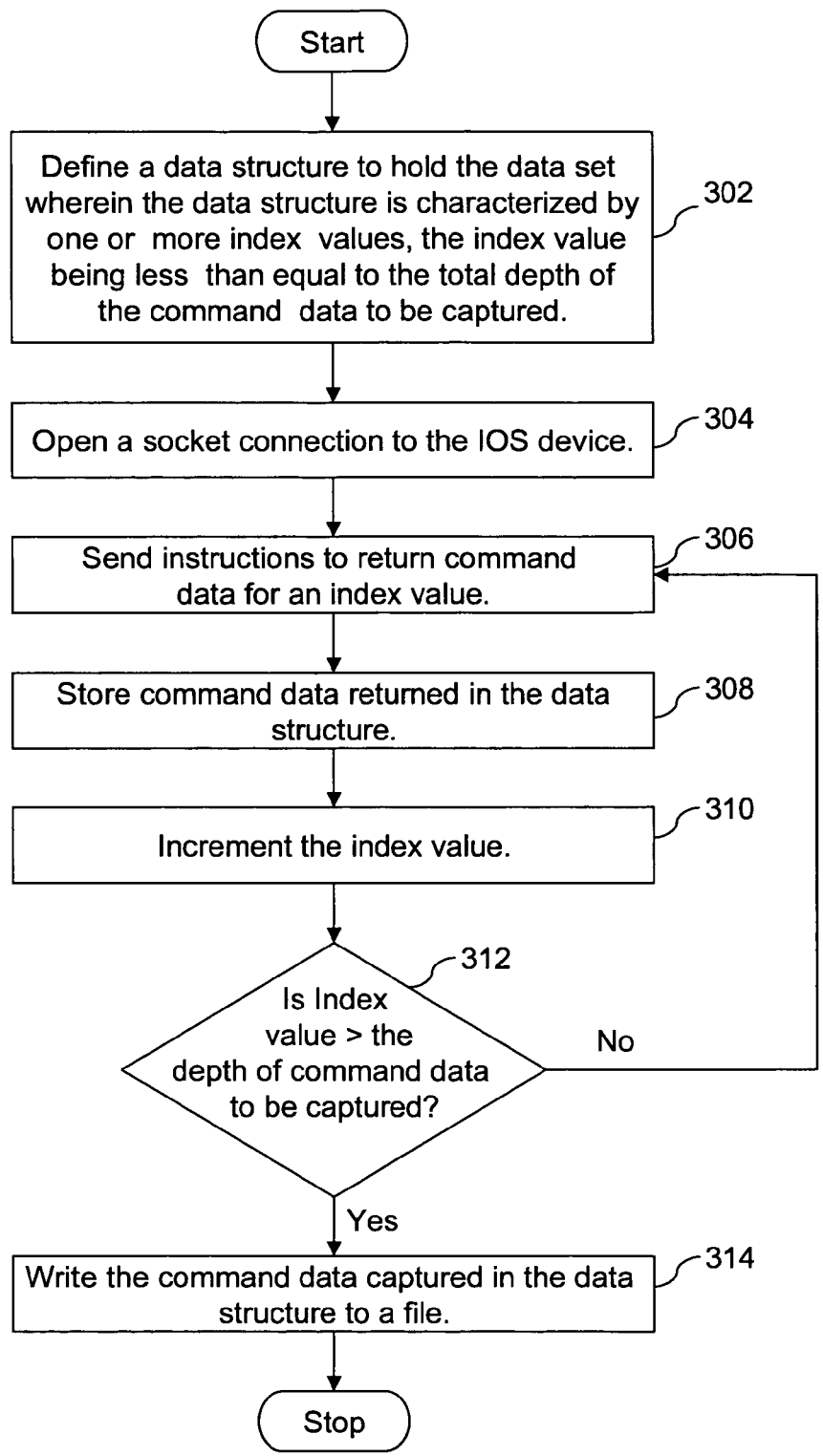
FIG. 3 is a flow chart depicting the requisite steps for emulation of an IOS device, in accordance with an exemplary embodiment of the present invention.

FIG. 3 is a flow chart depicting the requisite steps in emulation of an IOS device, in accordance with an exemplary embodiment of the present invention.

At step 302, a data structure is defined to hold the data set, wherein the data structure is characterized by one or more index values; the index value being less than equal to the total depth of the command data to be captured. At step 304, a socket connection to the IOS device is opened. In various embodiments, the socket connection is a telnet or Secure SHell (SSH) connection. The IOS device can provide a socket connection on a configured or default port. At step 306, instructions are sent to return command data from IOS device, for the index value specified in the data structure. In various embodiments of the invention, the character "?" is sent as an instruction to return command data from the IOS device. At step 308, the command data returned in response to the instructions sent at step 306 is stored in the data structure. At step 310, index value is incremented. At step 312, it is verified whether the index value exceeds the depth of the command data. The steps of sending, storing and incrementing are repeated till the index value exceeds the depth of command data to be captured. At step 314, all the data captured in the data structure is written in a file. In various embodiments of the invention, the file is based on the ASCII or binary format.

An algorithm that describes emulation of an IOS device, in accordance with an embodiment of the invention, is as follows:

```
Define data structure to hold CLI. This data structure is a tree.
open telnet session to the real device.
send first top level "?"
get top level command liststore top level command list in data struct
while (Certain depth of commands traverse recursively)
{
    telnet session -> send "?"
    get nth level command list "n-1 command ?"
    store nth level of commands in the tree
    for (i < command list)
    {
        get n+1 level of command list "n command ?"
        store for the n+1 level command in data struct tree
    }
    when n = user defined depth
    break
}
command capture store in tree based data structure
process the CLI in the tree based data structure
write data struct to the ASCII based file.
```

Sample code snippets, in accordance with the various embodiments of the invention, are as follows:

Snippet A:

```
A sample data structure that can be used in writing in the learner
application:
Struct cmd_token_t
{
        char*              token_t;
        int                index_token;
        char*              help_string_t;
        cmd_token_t        next_cmd_t;
};
```

Snippet B:

```
*A sample file output of the learner application"
show mpls traffic-eng topology
cmd enable show "Show running system configuration"
    {
        cmd enable mpls "MPLS information"
        {
            cmd enable traffic-eng "Traffic Engineering"
            {
                cmd enable topology "Topology information"
                {
                    execute something
                }
            }
        }
        cmd enable running-configuration "Running Configuration
        {
            cmd enable LINE "Include lines"
            {
                execute show running file
            }
        }
    }
```

Embodiments of the present invention have the advantage that the method provided is feasible and easy to scale. The data structure is in the tree format that makes the storing and loading of millions of commands in the data structure a very efficient and fast process. Indexing the commands allows the building of tree for the commands easy. Also, parsing of the commands is much easier with an indexed tree of commands. Tree-based data structures can be loaded easily into the memory. The amount of the data to be loaded is also reduced in this method as compared to the linear list, which is a direct equation of the combination/permutation of all the commands.

The embodiments of the invention also make learning of real devices easier for the user. The embodiments of the invention do not require the user to manually enter all the commands. In various embodiments of the invention, the commands are learned programmatically without any input from the user. The various embodiments of the invention also allow learning of commands from different modes of IOS/CATOS. The embodiments of the invention allow pieces or fragments of commands to be learned and modeled compared to the entire device as required. The ASCII-based indexed file can be programmatically modified and reused to solve other problems in the network management domain. Also, the ASCII based file is easier for the users to read and modify. The format of the various embodiments of the invention allows the users to execute programs on execution of a particular command or at particular instance in the entire command semantics.

Although the invention has been discussed with respect to the specific embodiments thereof, these embodiments are merely illustrative, and not restrictive, of the invention. For example, a 'method for emulation of an IOS device' can include any type of analysis, manual or automatic, to anticipate the needs of emulation of IOS devices.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method for emulation of a command line interface command for a commmand line interface associated with an Internetwork Operating System (IOS) device, the method comprising
   defining a data structure to hold a data set wherein the data structure is characterized by one or more index values, the index value being less than equal to the total depth of the command data to be captured from the IOS device, the command data usable for emulating a command for a command line interface;
   opening, using a computing device, a socket connection to the IOS device;
   sending instructions to return command data for an index value from the computing device to the IOS device;
   receiving the returned command data from the IOS device;
   storing the returned command data for a command line interface command in the data structure, the command data being indexed by the associated index value;
   incrementing the index value;
   repeating the sending, the storing and the incrementing till the index value exceeds the depth of command data to be captured; and
   writing the command data captured in the data structure to a file, wherein the returned command data are indexed by associated index values and can be used to emulate the command for the command line interface of the IOS device.

2. The method of claim 1, wherein the socket connection is terminated after writing the data to the file.

3. The method of claim 1, wherein the command data is stored in an ASCII based text file.

4. The method of claim 1, wherein the socket connection is a telnet connection.

5. The method of claim 1, wherein the socket connection is a Secure Shell (SSH) connection.

6. The method of claim 1, wherein the IOS device provides socket connection on a configured port.

7. The method of claim 1, wherein the IOS device provides socket connection on a default port.

8. The method of claim 1, wherein the data structure is in the form of a tree structure.

9. An apparatus for emulation of a command line interface command for a command line interface associated with an Internetwork Operating System (IOS) device, the apparatus comprising
   means for defining a data structure to hold a data set wherein the data structure is characterized by one or more index values the index value being less than equal to the total depth of the command data to be captured from the IOS device, the command data usable for emulating a command for a command line interface;
   means for opening, using a computing device, a socket connection to the IOS device;
   means for sending instructions to return the command data for an index value from the computing device to the IOS device;
   means for receiving the command data from the IOS device;
   means for storing the returned command data for a command line interface command in the data structure, the command data being indexed by the associated index value;
   means for incrementing the index value; wherein the increment is performed till the index value exceeds the depth of the command data; and
   means for writing all the data captured in the data structure to a file, wherein the returned command data are indexed by associated index values and can be used to emulate the command for the command line interface of the IOS device.

10. The system of claim 9 further comprising means for terminating socket connection after writing the data to the file.

11. A system for emulation of a command line interface command for a command line interface associated with a Internetwork Operating System (IOS) device, the system comprising
    an operating system;
    a memory having a data structure to hold a data set wherein the data structure is characterized by one or more index values, the index value being less than equal to the total depth of the command data to be captured from the IOS device, the command data usable for emulating a command for a command line interface;

a socket connection to the IOS device;

a sending module for sending instructions to return the command data for an index value from the computing device to the IOS device;

a receiving module for receiving the command data from the IOS device;

a storing module for storing the returned command data for a command line interface command in the data structure, the command data being indexed by the associated index value;

an incrementing module for incrementing the index value wherein the increment is performed till the index value exceeds the depth of the command data;

a repeating module to cause the storing module and incrementing module to repeat the storing and incrementing till the index value exceeds the the depth of the command data;

a writing module for writing the returned command data captured in the data structure to a file, wherein the returned command data are indexed by associated index values and can be used to emulate the command for the command line interface of the IOS device; and memory space on hard disk for storing the file.

12. The system of claim 11, wherein the operating system is selected from a group comprising Linux, Windows, Solaris, AIX and Mac Operating System.

13. The system of claim 11, wherein the socket connection is a telnet connection.

14. The system of claim 11, wherein the socket connection is a Secure Shell (SSH) connection.

15. The system of claim 11, wherein the IOS device provides socket connection on a configured port.

16. The system of claim 11, wherein the IOS device provides socket connection on a default port.

17. The system of claim 11, wherein the data structure stores the command data in the form of a tree structure.

18. The system of claim 11, wherein the command data is stored in an ASCII based text file.

19. A machine-readable storage medium including instructions for emulation of a command line interface command for a command line interface associated with an Internetwork Operating System (IOS) device, the medium comprising one or more instructions for defining a data structure to hold a data set wherein the data structure is characterized by one or more index values, the index value being less than equal to the total depth of the command data to be captured from the IOS device, the command data usable for emulating a command for a command line interface;

one or more instructions for opening, using the computing device, a socket connection to the IOS device;

one or more instructions for sending instructions to return the command data for an index value from the computing device to the IOS device;

one or more instructions for storing the returned command data for a command line interface command in the data structure, the command data being indexed by the associated index value;

one or more instructions for incrementing the index value, wherein the increment is performed till the index value exceeds the depth of the command data; and one or more instructions for writing all the returned data captured in the data structure to a file, wherein the returned command data are indexed by associated index values and can be used to emulate the command for the command line interface of the IOS device.

20. The machine readable storage medium of claim 19 additionally comprising one or more instructions for terminating the socket connection after writing the data to the file.

21. The machine readable storage medium of claim 19 wherein said one or more instructions for storing the returned command data in the data structure comprises one or more instructions for storing the returned command data in an ASCII based text file.

22. An apparatus for emulation of a command line interface command for a command line interface associated with an Internetwork Operating System (IOS) device, the apparatus comprising a processing system including a processor coupled to a display and user input device;

a machine-readable storage medium including instructions for emulation of an Internetwork Operating System (IOS) device executable by the processor, the medium comprising one or more instructions for defining a data structure to hold a data set wherein the data structure is characterized by one or more index values, the index value being less than equal to the total depth of the command data to be captured from the IOS device, the command data usable for emulating a command for a command line interface;

one or more instructions for opening, using the computing device, a socket connection to the device;

one or more instructions for sending instructions to return the command data for an index value from the computing device to the IOS device;

one or more instructions for storing the returned command data for a command line interface command in the data structure, the command data being indexed by the associated index value;

one or more instructions for incrementing the index value, wherein the increment is performed till the index value exceeds the depth of the command data; and one or more instructions for writing all the data captured in the data structure to a file, wherein the returned command data are indexed by associated index values and can be used to emulate the command for the command line interface of the IOS device.

* * * * *